United States Patent
Wen

(10) Patent No.: US 10,076,087 B2
(45) Date of Patent: Sep. 18, 2018

(54) AERIAL PLANT PLANTER

(71) Applicant: Xiamen Wensign Enterprises Limited, Xiamen, Fujian (CN)

(72) Inventor: Weipeng Wen, Xiamen (CN)

(73) Assignee: Xiamen Wensign Enterprises Limited, Xiamen, Fujian (CN)

( * ) Notice: Subject to any disclaimer, the term of this patent is extended or adjusted under 35 U.S.C. 154(b) by 184 days.

(21) Appl. No.: 15/015,106

(22) Filed: Feb. 3, 2016

(65) Prior Publication Data
US 2017/0156271 A1    Jun. 8, 2017

(30) Foreign Application Priority Data
Dec. 2, 2015    (CN) .......................... 2015 1 0870100

(51) Int. Cl.
*A01G 9/12*    (2006.01)
(52) U.S. Cl.
CPC ...................... *A01G 9/12* (2013.01)
(58) Field of Classification Search
CPC ... A01G 5/00; A01G 9/12; A01G 5/04; A01G 5/06; A01G 9/126; A61H 7/00; A61H 37/00
See application file for complete search history.

(56) References Cited

U.S. PATENT DOCUMENTS

| | | | |
|---|---|---|---|
| 551,000 A * | 12/1895 | Parker | A01G 9/12 248/175 |
| 1,057,017 A * | 3/1913 | Trepel | A01G 5/04 47/55 |
| 1,151,583 A * | 8/1915 | Hanson | A61B 17/44 294/100 |
| 1,769,198 A * | 7/1930 | Albany | A01G 5/00 24/6 |
| 1,892,393 A * | 12/1932 | Halm | A01G 5/04 47/41.13 |
| 6,592,532 B1 * | 7/2003 | Haung | A46D 1/0253 601/107 |
| 2002/0049400 A1 * | 4/2002 | Lacey | A61H 7/003 601/137 |

* cited by examiner

*Primary Examiner* — Kristen C Hayes
(74) *Attorney, Agent, or Firm* — Raymond Y. Chan; David and Raymond Patent Firm

(57) ABSTRACT

An aerial plant planter includes a fixing portion; and a retaining portion upwardly extended from the fixing portion, wherein the retaining portion comprises at least three retaining members, wherein the retaining members are universally and spacedly arranged around an axis to from a retaining cavity having a retaining opening, wherein a diameter of the retaining cavity is gradually increased from the retaining opening.

6 Claims, 10 Drawing Sheets

AERIAL PLANT PLANTER

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an ornamental plant planter, and more particularly to an aerial plant planter.

Description of Related Arts

Aerial plant, such as air plant (Latin name: *Tillandsia*), and some orchids can be directly grown by the air cultivation, instead of growing in the soil-based substrate. Many kinds of aerial plants can effectively purify environmental and air pollutants, and the cultivation of the aerial plants is very simple and easy. Therefore, the aerial plants can be placed in various types of drafty and well-lighted rooms, and the aerial plants also can be planted as ornamental plants.

Since the aerial plants can be grown without soil-based substrate, the aerial plants can't be limited by planting with water and soils, so the aerial plants have several kinds of cultivation and display methods. People generally bound the roots of the aerial plants in rope and hang in the air, or use a glue to stick the aerial plants on various kinds of objects, or directly places the aerial plants in various kinds of planters for decorations and displays.

However, the above mentioned traditional cultivation and display methods have their disadvantages. At first, due to the gravity of the aerial plants, the aerial plants having tied roots tends to hang upside down, so that the aerial plants will be easily shaking under the winds, and the aerial plants cannot be grown towards a required direction according to actually ornamental requirements. At the same time, the aerial plants with bounded roots affects the aesthetic effects of the aerial plants, and sticking the aerial plants by a glue highly affect the growth condition of the aerial plants, and at the same time, when the aerial plants are affixed on a specific object, the aerial plants cannot be moved or replaced, and in addition, surfaces of some objects are not suitable by using glue. Due to the aerial plants are hanged in the air, the aerial plants are placed in the planters by the gravity, so if the planters are moved or placed horizontally, transversely, or inversely, the aerial plants will fall down from the planter, and at the same time, due to the aerial plants are usually light in weight, the aerial plants will also easily fall down under the winds. Furthermore, the shape of the traditional aerial plant planter is fixed, so that the shape of the aerial plant planter cannot be selectively adjusted in order to match the size and growing condition of the aerial plants. Therefore, the traditional aerial plant planters has a strong disadvantages for limiting the ornamental application scope, and has weaken the no-soil cultivation properties of the aerial plants. Again, the traditional aerial plant planers cannot completely cover the roots portion of the aerial plants, so the overall aesthetic effects of the aerial plants are affected. Furthermore, while the aerial plants are placed in the trellises, people need to move the trellises in order to move or transport the aerial plants. However, the aerial plants aren't affixed on the trellises, so the aerial plants are easy to fall down from the trellises during the transportation. On the other hand, planting the aerial plants in the planters or trellises are difficult for transportation. At last, if the aerial plants are hanged on the trellises, the trellises needs to be supporting on another supporting frame, so the trellises cannot be easily affix on the wall or ceiling without supplemental accessories.

SUMMARY OF THE PRESENT INVENTION

The invention is advantageous in that it provides an aerial plant planter, wherein the aerial plant planter comprises a retaining cavity to securely maintain the aerial plants and branch and leafs of the aerial plants being deposited therein.

Another advantage of the invention is to provide an aerial plant planter, wherein the aerial plant planter is able to prevent the aerial plants from falling down from the aerial plant planter during the transportation.

Another advantage of the invention is to provide an aerial plant planter, wherein the retaining cavity is formed by the retaining members, wherein the retaining members are made of deformable materials, such as flexible materials, so that the size of the retaining cavity can be selectively adjusted.

Another advantage of the invention is to provide an aerial plant planter, wherein a diameter of the retaining cavity is gradually increased from the retaining opening, so as to securely retain the aerial plant being deposited inside the retaining cavity. On the other hand, the retaining opening of the retaining cavity can prevent the aerial plants from falling down from the aerial plant planter while the aerial plant planter is hanging upside down. Alternatively, the diameter of the retaining cavity is inwardly and gradually increased from the retaining opening.

Another advantage of the invention is to provide an aerial plant planter, wherein the aerial plant planter comprises a bounding member surroundingly arranged on the retaining portion to maintain the size of the retaining opening of the retaining cavity, so as to maintain the size of the retaining opening of the retaining cavity due to the deformation of the retaining portion, so as to stability maintain the aerial plant being deposited inside the retaining cavity, wherein the bounding member can be a band-shape, a linear-shape, a cyclic-shape, or other shapes.

Another advantage of the invention is to provide an aerial plant planter, wherein the retaining portion comprises a set of spacedly arranged retaining member, so a retaining clearance is generated between two adjacent members of the retaining portion to allow branches and leafs of the aerial plants extending therefrom, so the retaining members can be hidden and covered by the branches and leafs of the aerial plants, and the overall structure of the aerial plant planter will not affect the aesthetic effects of the aerial plants. Therefore, the retaining member is preferably a rod-like or stick-like shape. Preferably, the retaining member can be a strength-improved thin wire or wire like material.

Another advantage of the invention is to provide an aerial plant planter, wherein each of the retaining member of the aerial plant planter comprises a location hole, wherein the bounding member is arranged inside the location hole to prevent the bounding member breaking away from the location hole.

Another advantage of the invention is to provide an aerial plant planter, wherein each of the retaining members of the retaining portion comprises a hanger inwardly or outwardly bended from the retaining end and deposited inside the retaining cavity, so as to prevent the clothes of the user being caught by the hanger.

Another advantage of the invention is to provide an aerial plant planter, wherein the location hole of the retaining member is able to allow ornaments being hanging thereinto to improve the aesthetic effect of the aerial plants.

Another advantage of the invention is to provide an aerial plant planter, wherein no expensive and complicated structure and configuration is required to be employed in order to achieve the above mentioned objects. Therefore, the present invention successfully provides a low cost, easy manufacture, and easy to use aerial plant planter.

Additional advantages and features of the invention will become apparent from the description which follows, and may be realized by means of the instrumentalities and combinations particular point out in the appended claims.

According to the present invention, the foregoing and other objects and advantages are attained by an aerial plant planter, comprising:

a fixing portion; and a retaining portion upwardly extended from the fixing portion, wherein the retaining portion comprises at least three retaining members, wherein the retaining members are universally and spacedly arranged around an axis to from a retaining cavity having a retaining opening, wherein a diameter of the retaining cavity is gradually increased from the retaining opening.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
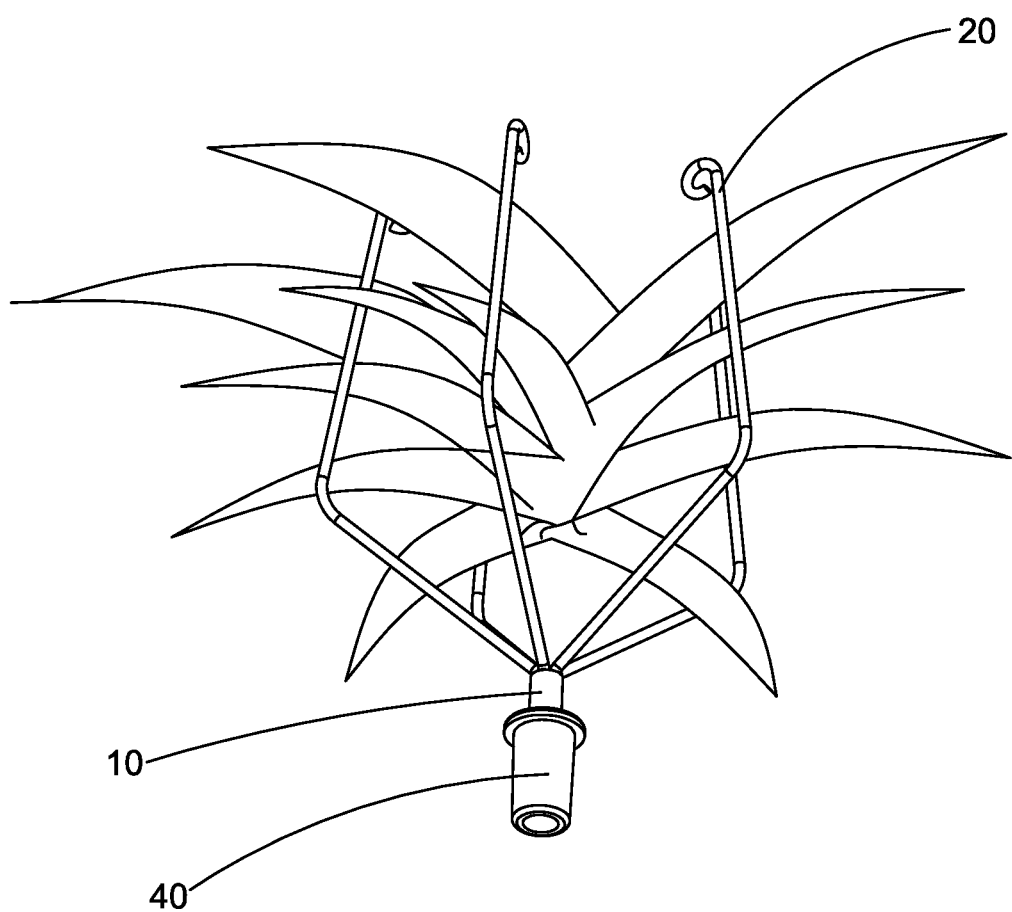
FIG. 1A is a perspective view of an aerial plant planter according to a preferred embodiment of the present invention, illustrating an aerial plant being deposited inside the aerial plant planter.
Figure 1B:
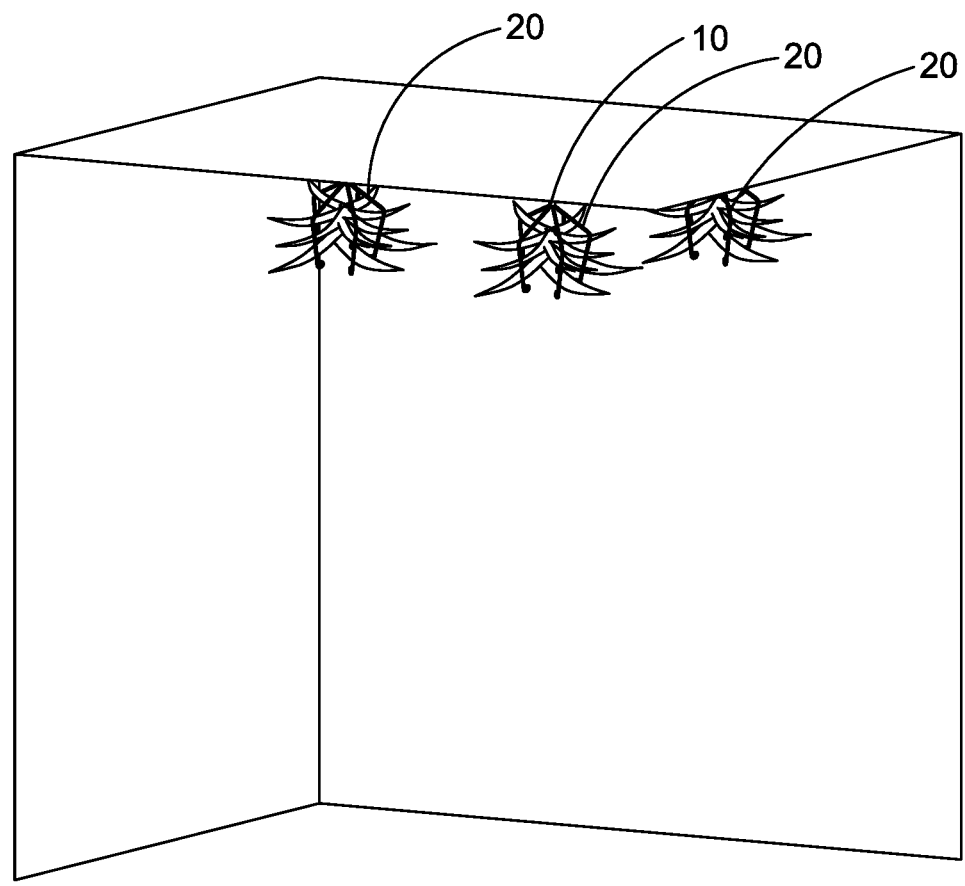
FIG. 1B is a perspective view of an aerial plant planter according to a preferred embodiment of the present invention, illustrating the aerial plant planter hanging on the ceiling.
Figure 1C:
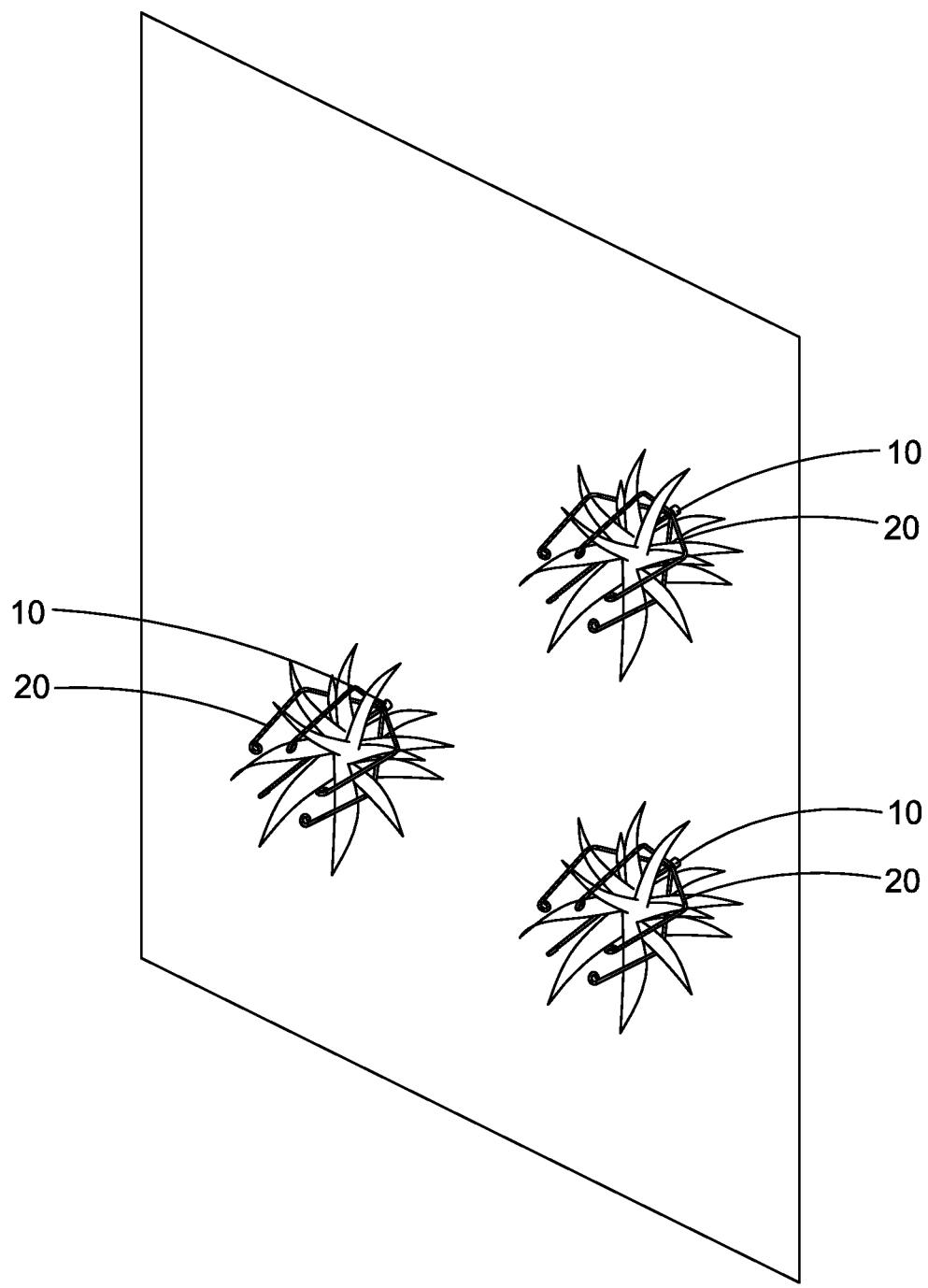
FIG. 1C is a perspective view of an aerial plant planter according to the above preferred embodiment of the present invention, illustrating the aerial plant planter being sidewardly arranged on the wall.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1A to FIG. 4 of the drawings, an aerial plant planter according to a preferred embodiment of the present invention is illustrated, wherein the aerial plant planter comprises a fixing portion 10 and a retaining portion 20 upwardly extended from the fixing portion 10, wherein the retaining portion 20 comprises a retaining cavity 200 to accommodate the aerial plant, wherein the retaining portion 20 comprises a retaining opening 201, and a diameter of the retaining cavity 200 is gradually increased from the retaining opening 201. The aerial plants or main portions of the aerial plants can be accommodated within the retaining cavity 200 so as to prevent the aerial plants from falling down from the aerial plant planter. On the other hand, the diameter of the retaining cavity 20 is gradually increased from the retaining opening 201, so that the retaining opening 201 can be a locker to retain the aerial plants placing inside the retaining cavity 20, so as to prevent the aerial plants falling out of the retaining cavity 20. It is worth mentioned that the retaining portion 20 of the aerial plant planter is able to affix the aerial plant in a stable position, wherein the aerial plant planter has several kinds of display and ornamental methods, so that the aerial plant planter of the present invention can be transversely planed along the wall or hanged it on the ceiling.

As shown in FIG. 1 to FIG. 4 of the drawings, the retaining portion 20 of the aerial plant planters according to the preferred embodiment of the present invention comprises a set of retaining member 21, wherein the retaining members 21 are spacedly and universally extended from the fixing portion 10 to form the retaining cavity 200 of the retaining portion 20. On the other hand, the retaining portion 20 comprises at least three retaining members 21, wherein the retaining members 20 are universally arranged around an axis 101 to form the retaining cavity 200. Preferably, the retaining members 20 are made of flexible materials, such as flexible metal material, and the diameter of the retaining opening 201 of the retaining cavity 200 of the retaining portion 20 is smaller than a diameter of the crown of the aerial plants, so while the aerial plants are deposited inside the retaining cavity 200 of the retaining portion 20, the retaining members 21 of the retaining portion 20 are outwardly extended, so the diameter of the retaining opening 201 of the retaining cavity 200 is enlarged in order to place the aerial plant inside the retaining cavity 200. Since the aerial plants are placed inside the retaining cavity 200 through the retaining opening 201, the retaining members 21 of the retaining portion 20 are reinstated to their original position, so the diameter of the retaining opening 201 of the retaining cavity 200 are also reinstated to its original size. The retaining members 21 of the retaining portion 20 can be outwardly extended again to enlarge the diameter of the retaining opening 201 of the retaining cavity 200 so as to take down the aerial plants from the aerial plant planter.

In addition, the retaining members 21 of the retaining portion 20 are made of flexible materials, so that during the aerial plants being placed inside or taken out from the retaining cavity 200, the retaining members 21 of the retaining portion 20 will not generate irreversibly damaged, such as being broken or generate permanently deformation. Furthermore, each of the retaining members 21 of the retaining portion 20 are spacedly and adjacently placed with each other, so a retaining clearance 202 is generated between two adjacent retaining members 21 of the retaining portion 20. And, the clearance 20 is adapted to allow branches and leafs of the aerial plants extending therefrom, so the retaining members 21 can be hidden and covered by the branches and leafs of the aerial plants, and the overall structure of the aerial plant planter will not affect the aesthetic effects of the aerial plants. Moreover, the retaining members 21 of the retaining portion 20 are made of flexible materials to adapt the growing condition of the aerial plants. According to that the size of the aerial plants become bigger and bigger during the growing of the aerial plants, the retaining members 21 of the retaining portion 20, which are made of flexible materials, have deformation abilities to being enlarged along the growing condition of the aerial plants, so the growing condition of the aerial plants will not be affected by the retaining members 21 of the retaining portion 20. Preferably, the fixing portion 10 and each of the retaining members 21 of the retaining portion 20 are an integrity.

It is worth to mention that the retaining members 21 are rods. Alternatively, the retaining members 21 also can be strips. Moreover, the retaining members 21 also can be any kinds of shapes in order to achieve the objects of the present invention.

Figure 2:
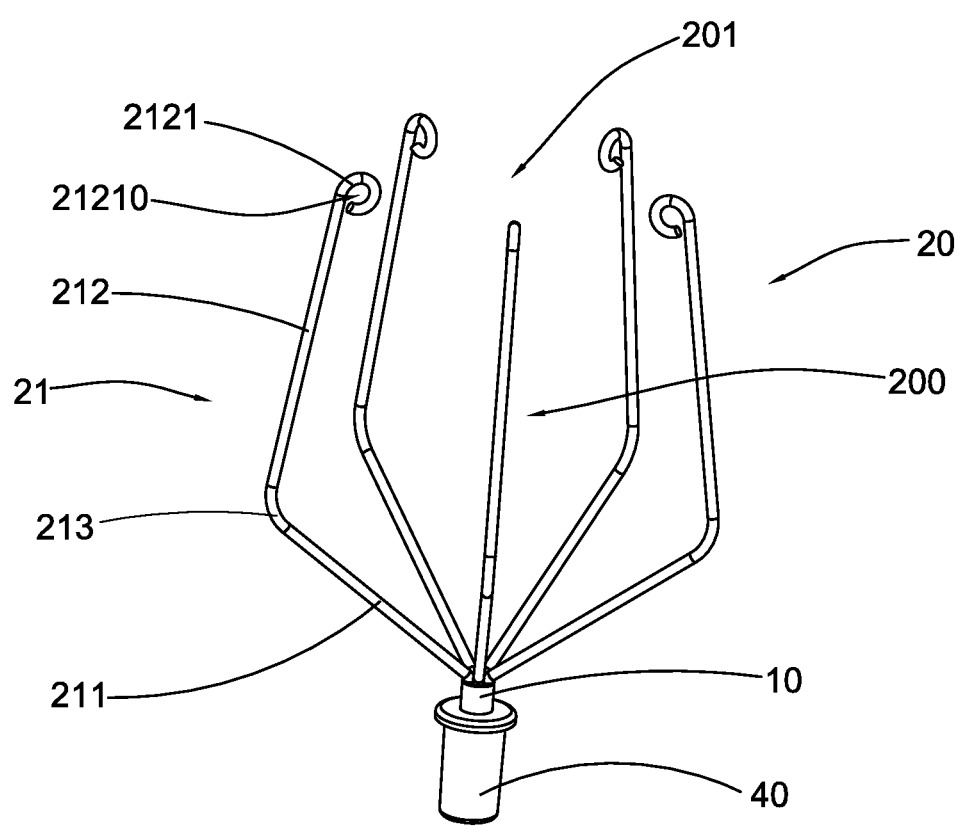
FIG. 2 is a perspective view of an aerial plant planter according to the above preferred embodiment of the present invention.
Figure 4:
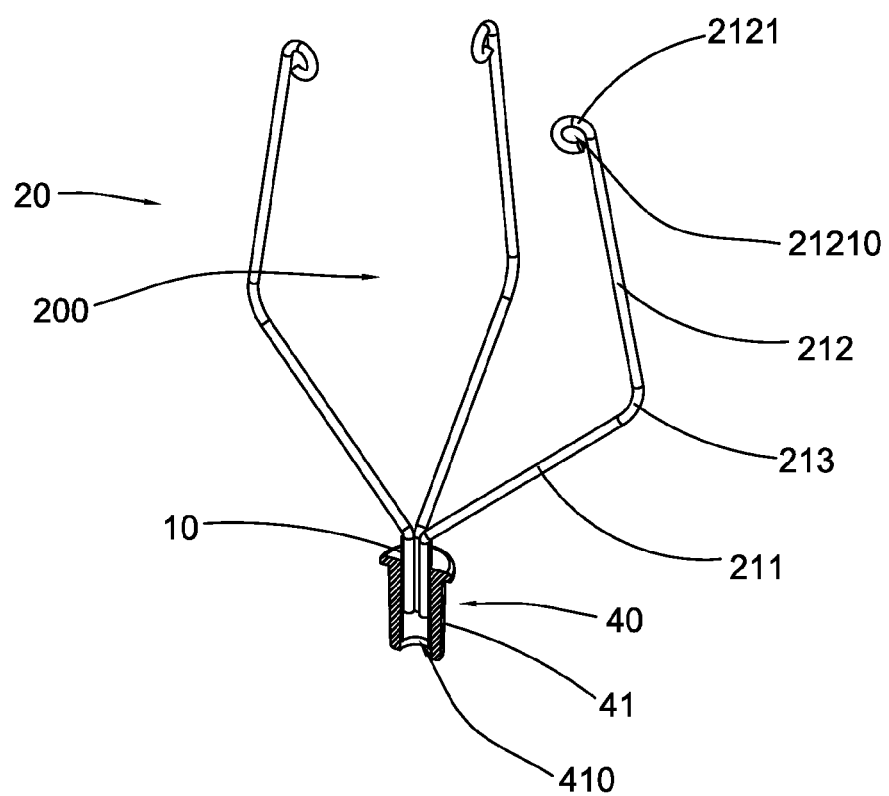
FIG. 4 is a sectional view of an aerial plant planter according to the above preferred embodiment of the present invention.

As shown in FIG. 2 and FIG. 4 of the drawings, each of the retaining members 21 of the retaining portion 20 comprises a supporting end 211, a retaining end 212, and a connecting portion 213 formed between the supporting end 211 and the retaining end 212, wherein the supporting end 211 is outwardly and upwardly extended from the fixing portion 10, wherein the connecting portion 213 is extended from the supporting end 211, wherein the retaining end 212 is inwardly and upwardly extended from the connecting portion 213, wherein the connecting portion 213 is an arc-shaped structure, which can not only securely support the connection between the supporting end 211 and the retaining end 212, but also support the aerial plants being placed inside the retaining cavity 200, and the retaining members 21 of the retaining portion 20 will not be easily broken. On the other hand, the arc-shaped connecting portion 213 and the supporting end 211 can support the gravity of the aerial plants being homogeneously dispersed on the retaining members 21 of the retaining portion 20, so that the retaining members 21 of the retaining portion 20 can provide better supporting function to the aerial plants. Furthermore, the retaining cavity 200 is formed by the retaining ends 212 of the retaining portion 21, and a diameter of the retaining cavity 200 is gradually increased from outside to inside, so while the aerial plants are placed inside the aerial plant planter and being hanged upside down, the retaining end 212 of the retaining member 21 can provide a retaining force to the aerial plants, so as to prevent the aerial plants from falling down from the retaining cavity 200.

It is worth mention that the supporting ends 211 of the retaining members 21 of the retaining portion 20 are arranged to form a supporting structure, so as to support and retain the aerial plants in a suitable position. Therefore, the retaining portion 20 preferably comprises at least three spacedly arranged retaining members 21, which are extended from the fixing portion 10, to support the aerial plants being securely retained inside the retaining cavity 200.

It is noted that the retaining cavity 200 is formed by the retaining ends 212 of the retaining members 21, and the supporting ends 211 are upwardly extended from the fixing portion 10 to form an accommodating cavity, wherein a diameter of the accommodating cavity is gradually decreased from top-to-bottom.

Figure 3:
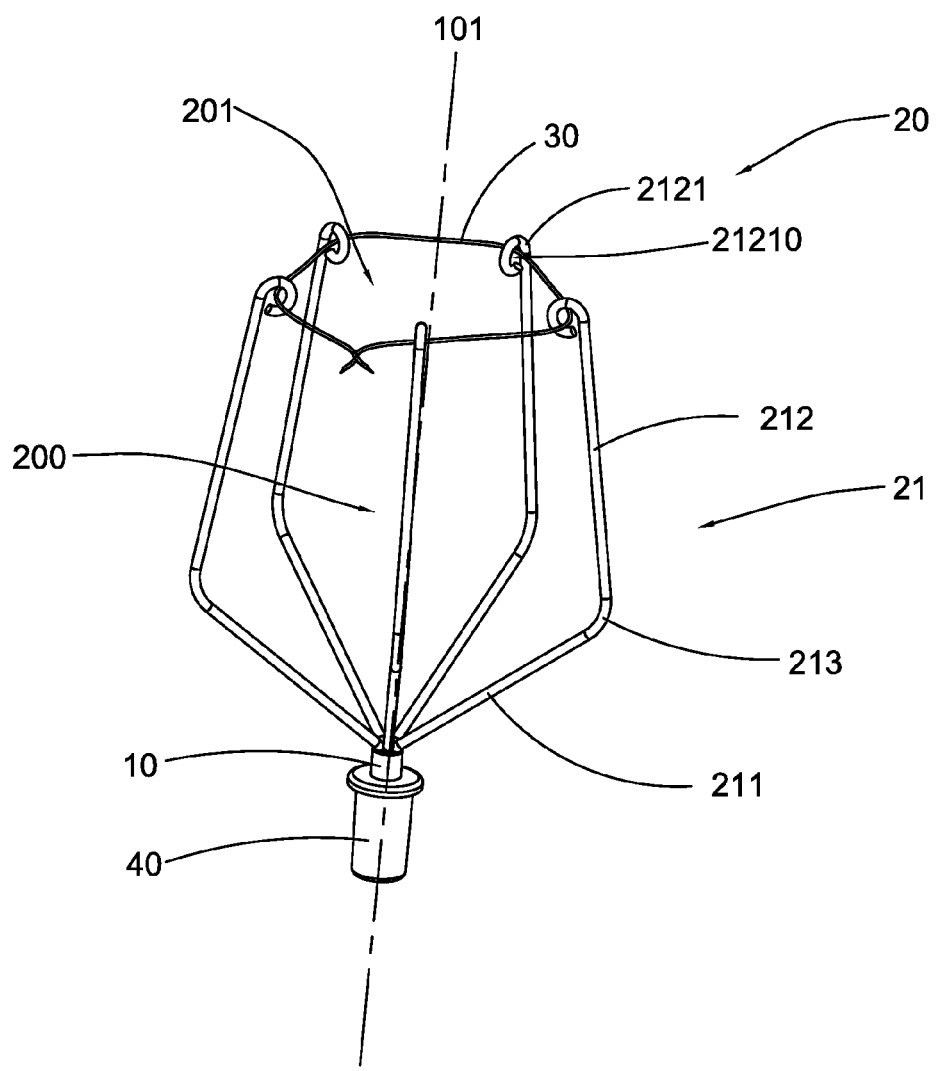
FIG. 3 is a perspective view of an aerial plant planter according to the above preferred embodiment of the present invention, illustrating a bounding member being locked into the location hole.

Referring to FIG. 3 of the drawings, the aerial plant planter according to the preferred embodiment of the present invention comprises a bounding member 30, wherein the bounding member 30 is surroundingly arranged on the retaining portion 20 to maintain the size of the retaining opening 201 of the retaining cavity 200, so as to prevent the retaining portion 20 being dropped out from the retaining cavity 200. On the other hand, the bounding member 30 is arranged to maintain the size of the retaining opening 201 of the retaining cavity 200 due to the deformation of the retaining portion 20, so as to stability maintain the aerial plant being deposited inside the retaining cavity 200. It is worth to mention that the bounding member 30 can be a band-shape, a linear-shape, a cyclic-shape, or other shapes which can achieve the same functions of the present invention.

Referring to FIG. 1A to FIG. 4 of the drawings, each of the retaining members 21 of the retaining portion 20 comprises a hanger 2121 inwardly bended from the retaining end 212 and deposited inside the retaining cavity 200, wherein each of the hangers 2121 comprises a location hole 21210 to allow the bounding member 30 being passed therethrough to prevent the bounding member 30 being slipped out from the location hole 21210 of the hanger 2121, wherein the hangers 2121 are deposited inside the retaining cavity 200 to prevent the clothes of the user being caught by the hanger 2121.

Referring to FIG. 1A to FIG. 4 of the drawings, the aerial plant planter of the present invention comprises a affixing member 40, wherein the affixing member 40 comprises a base 41 having an interference connection hole 410, wherein an inner diameter of the interference connection hole 410 is slightly larger than the outer diameter of the fixing portion 10, so while the fixing portion 10 is placed inside the interference connection hole 410, the fixing portion 10 will not be easily falling down from the interference connection hole 410. Therefore, the aerial plant planter can be incorporated with other supporting objects by the affixing member 40, so as to attach the aerial plant planter on other supporting objects. Preferably, the affixing member 40 can be a rod or other shapes which can be used to incorporate with the supporting objects.

Figure 5A:
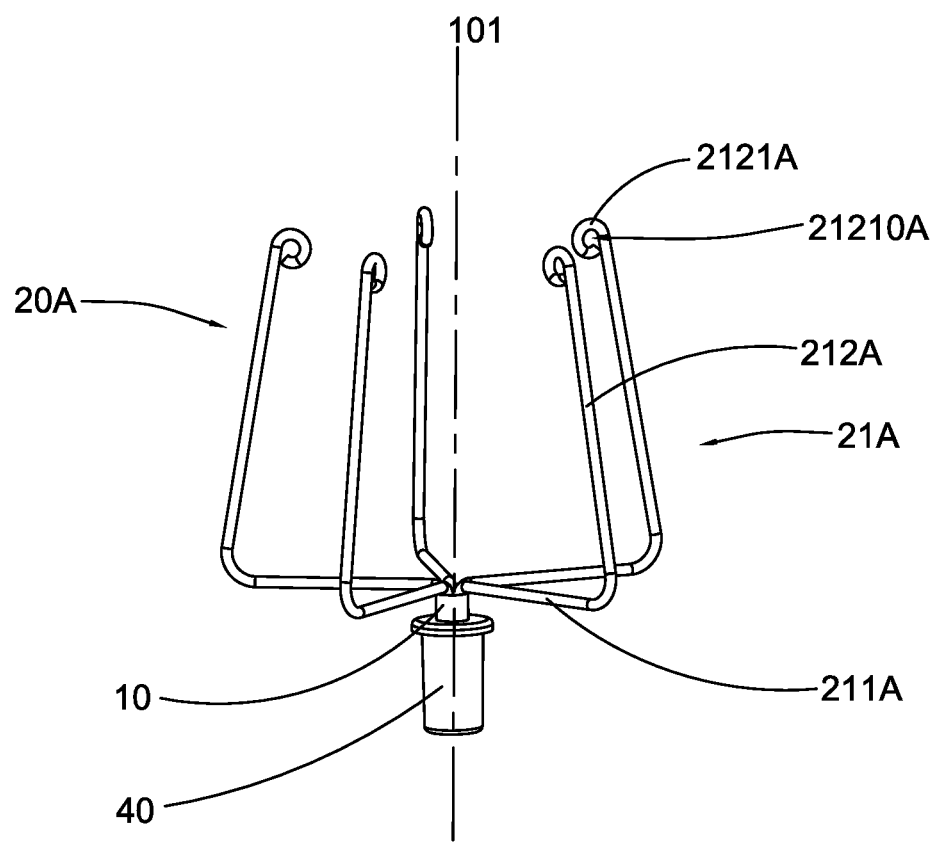
FIG. 5A is a first alternative mode of a retaining member of the retaining portion according to the above preferred embodiment of the present invention.

As shown in FIG. 5A, a first alternative mode of the retaining members 21 of the retaining portion 20 is illustrated, wherein each of the retaining members 21A comprises a supporting end 211A outwardly extended from the fixing portion 10, and a retaining end 212A upwardly and inwardly extended from the retaining end 211A, wherein the supporting end 211A of the retaining members 21A of the retaining portion 20A are arranged to form a retaining cavity 200A. It is worth to mention that the supporting end 211A of the retaining member 21A of the retaining portion 20 can be arranged to form a supporting structure, so as to support and retain the aerial plants in suitable position. Therefore, the retaining portion 20 comprises at least three spacedly arranged retaining members 21A, which are extended from the fixing portion 10, wherein a retaining cavity 200 is formed by the retaining members 21A to stability retain the aerial plants being inside the retaining cavity 200. In addition, since the retaining ends 212A of the retaining portion 20 are inwardly and upwardly extended from the supporting end 211A, the retaining members 21A of the retaining portion 20 is a V-shaped structure. Preferably, an angle between the retaining end 212A and the supporting end 211A of the retaining members 21A of the retaining portion 20 is smaller than 120 degrees.

Figure 5B:
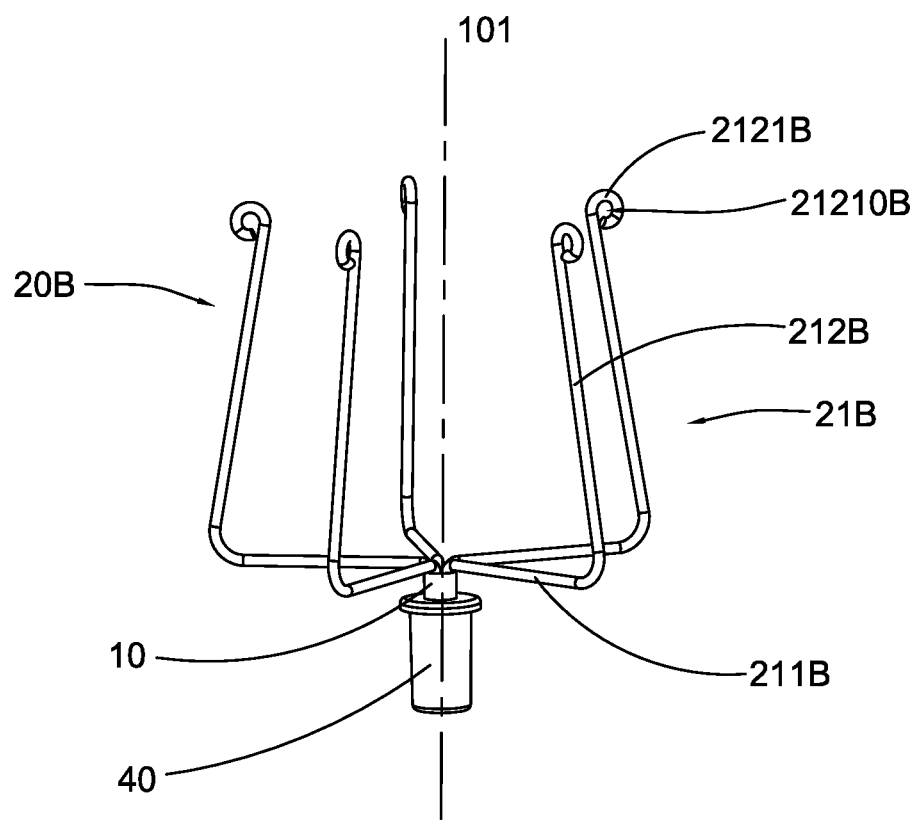
FIG. 5B is a second alternative mode of a retaining member of the retaining portion according to the above preferred embodiment of the present invention.

As shown in FIG. 5B, a second alternative mode of the retaining members 21 of the retaining portion 20 is illustrated, wherein each of the retaining end 212B of the retaining members 21B comprises a hanger 2121B inwardly bended from the retaining end 212B and deposited inside the retaining cavity 200, wherein each of the hangers 2121B comprises a location hole 21210B to allow the bounding member 30 being passed therethrough, so as to prevent the bounding member 30 being slipped out from the location hole 21210B of the hanger 2121B.

Figure 6A:
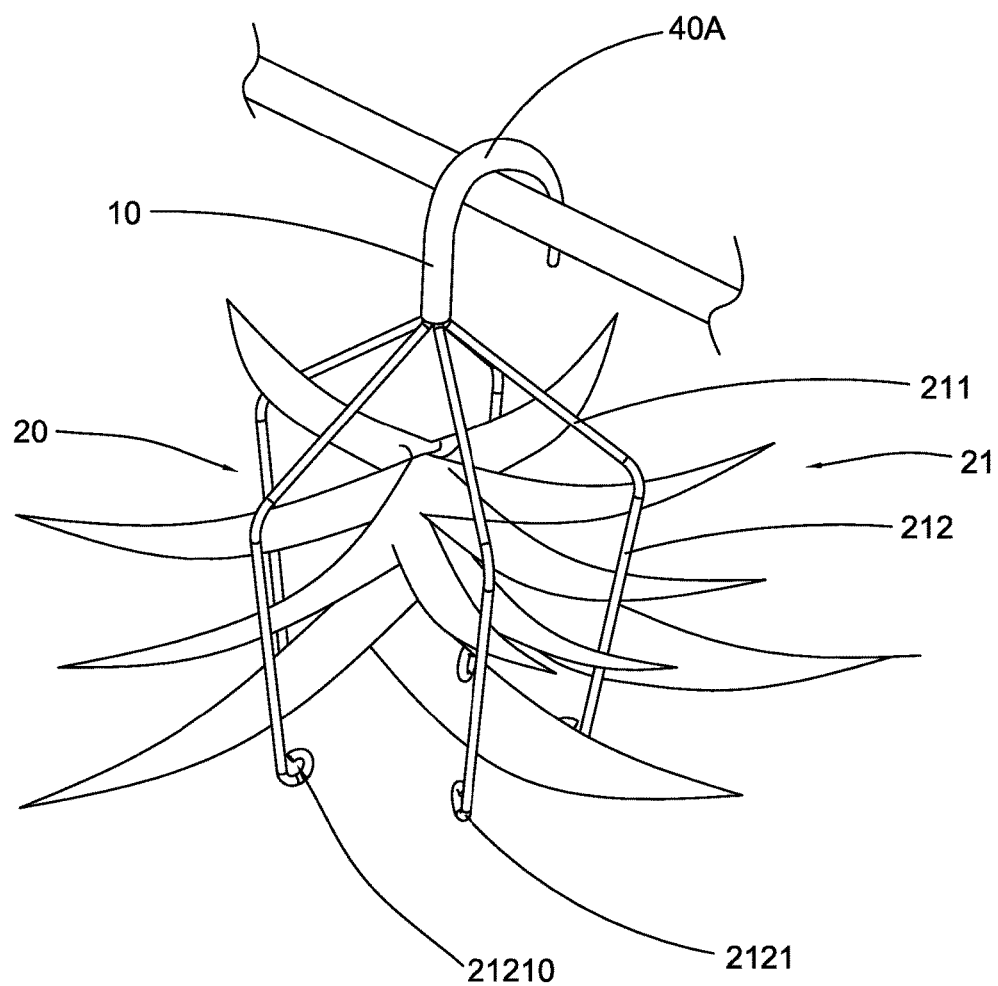
FIG. 6A is a perspective view of a first alternative mode of an affixing member according to the above preferred embodiment of the present invention.

As shown in FIG. 6A, a first alternative mode of the affixing member 40 according to the above preferred embodiment of the present invention is illustrated, wherein the affixing member 40 is a hanger to be adapted to hang on other kinds of supporting objects.

Figure 6B:
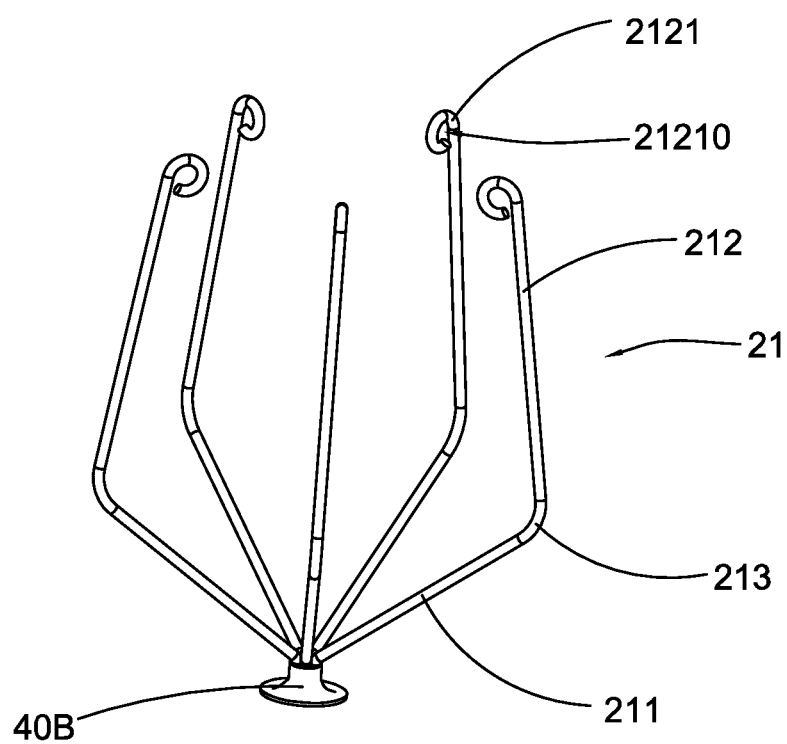
FIG. 6B is a perspective view of a second alternative mode of an affixing member according to the above preferred embodiment of the present invention.

As shown in FIG. 6B, a second alternative mode of the affixing member 40 according to the above preferred embodiment of the present invention is illustrated, wherein the affixing member 40 is a vacuum chuck to be adapted to attach the aerial plant planter on any kinds of smooth surface.

It is worth to mention that the affixing member 40 can be designed as different kinds of structure in order to attach the fixing portion 10 of the aerial plant planter on different kinds of supporting objects.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An aerial plant planter for supporting an aerial plant on a supporting object, comprising:
an affixing member adapted for affixing at the supporting object;
a fixing portion extended from said affixing member; and
a retaining portion which comprises at least three retaining members extended from said fixing portion, wherein said retaining members are universally and spacedly arranged around an axis to form a retaining cavity for accommodating the aerial plant therein, wherein a retaining opening is formed to communicate with said retaining cavity, wherein each of said retaining members comprises a retaining end, a supporting end outwardly extended from said fixing portion, and a connecting portion extended between said retaining end and said supporting end, wherein said retaining end is inwardly extended from said connecting portion, wherein said retaining cavity is defined within said retaining ends of said retaining members that a diameter of said retaining cavity is gradually increased from said retaining opening towards said connecting portion, wherein said retaining ends of said retaining member provide a retaining force for retaining the aerial plant so as to prevent the aerial plant falling down from said retaining cavity, wherein said connecting portion is an arc-shaped structure that said supporting ends of said retaining members are outwardly and upwardly extended from said fixing portion, wherein each of said retaining members has a V-shaped structure, wherein each of said retaining member of said retaining portion is made of a flexible material.

2. The aerial plant planter, as recited in claim 1, further comprising a bounding member surroundingly arranged on said retaining member of said retaining portion to maintain a size of said retaining opening.

3. The aerial plant planter, as recited in claim 2, wherein each of said retaining members of said retaining portion comprises a hanger inwardly bended from said retaining end and deposited inside said retaining cavity, wherein each of said hangers has a location hole.

4. The aerial plant planter, as recited in claim 3, wherein said affixing member comprises a base having an interference connection hole, wherein an inner diameter of said interference connection hole is slightly larger than an outer diameter of said fixing portion for preventing said fixing portion being fallen down from said interference connection hole when said fixing portion is placed inside said interference connection hole.

5. An aerial plant planter for supporting an aerial plant on a supporting object, comprising:
an affixing member adapted for affixing at the supporting object;
a fixing portion extended from said affixing member;
a retaining portion which comprises at least three retaining members extended from said fixing portion, wherein said retaining members are universally and spacedly arranged around an axis to form a retaining cavity for accommodating the aerial plant therein, wherein a retaining opening is formed to communicate with said retaining cavity, wherein each of said retaining members comprises a retaining end, a supporting end outwardly extended from said fixing portion, and a connecting portion extended between said retaining end and said supporting end, wherein said retaining end is inwardly extended from said connecting portion, wherein said retaining cavity is defined within said retaining ends of said retaining members that a diameter of said retaining cavity is gradually increased from said retaining opening towards said connecting portion, wherein said retaining ends of said retaining member provide a retaining force for retaining the aerial plant so as to prevent the aerial plant falling down from said retaining cavity, wherein said connecting portion is an arc-shaped structure that said supporting ends of said retaining members are outwardly and upwardly extended from said fixing portion, wherein each of said retaining members has a V-shaped structure; and
a bounding member surroundingly arranged on said retaining member of said retaining portion to maintain a size of said retaining opening.

6. An aerial plant planter for supporting an aerial plant on a supporting object, comprising:

an affixing member adapted for affixing at the supporting object;

a fixing portion extended from said affixing member; and a retaining portion which comprises at least three retaining members extended from said fixing portion, wherein said retaining members are universally and spacedly arranged around an axis to form a retaining cavity for accommodating the aerial plant therein, wherein a retaining opening is formed to communicate with said retaining cavity, wherein each of said retaining members comprises a retaining end, a supporting end outwardly extended from said fixing portion, and a connecting portion extended between said retaining end and said supporting end, wherein said retaining end is inwardly extended from said connecting portion, wherein said retaining cavity is defined within said retaining ends of said retaining members that a diameter of said retaining cavity is gradually increased from said retaining opening towards said connecting portion, wherein said retaining ends of said retaining member provide a retaining force for retaining the aerial plant so as to prevent the aerial plant falling down from said retaining cavity, wherein said connecting portion is an arc-shaped structure that said supporting ends of said retaining members are outwardly and upwardly extended from said fixing portion, wherein each of said retaining members has a V-shaped structure, wherein each of said retaining members of said retaining portion comprises a hanger inwardly bended from said retaining end and deposited inside said retaining cavity, wherein each of said hangers has a location hole.

* * * * *